United States Patent
Kent (10) Patent No.: US 8,898,560 B1
(45) Date of Patent: Nov. 25, 2014

(54) FIXING PROBLEMS WITH A USER INTERFACE

(75) Inventor: James Kent, London (GB)

(73) Assignee: Google, Inc., Mountain View, CA (US)

( * ) Notice: Subject to any disclaimer, the term of this patent is extended or adjusted under 35 U.S.C. 154(b) by 154 days.

(21) Appl. No.: 13/455,737

(22) Filed: Apr. 25, 2012

(51) Int. Cl.
*G06F 17/22* (2006.01)

(52) U.S. Cl.
USPC .......... 715/234; 715/205; 715/206; 705/7.11; 705/7.12; 705/7.22; 705/7.26; 705/14.43; 705/14.45; 705/14.6; 709/223; 709/224; 709/225; 709/226; 717/124

(58) Field of Classification Search
CPC ............ G06F 17/2235; G06F 17/2241; G06F 17/2247
USPC ......... 705/7.11, 7.12, 7.22, 7.26, 7.27, 14.43, 705/14.45, 14.6; 709/223–226; 715/205, 715/206, 234; 717/124
See application file for complete search history.

(56) References Cited

U.S. PATENT DOCUMENTS

| | | | |
|---|---|---|---|
| 7,107,535 B2 | 9/2006 | Cohen et al. | |
| 2003/0033194 A1* | 2/2003 | Ferguson et al. | 705/10 |
| 2003/0033587 A1* | 2/2003 | Ferguson et al. | 717/104 |
| 2003/0130899 A1* | 7/2003 | Ferguson et al. | 705/26 |
| 2006/0253345 A1 | 11/2006 | Heber | |
| 2007/0106758 A1* | 5/2007 | Chi et al. | 709/219 |
| 2008/0201206 A1 | 8/2008 | Pokorney et al. | |
| 2008/0306815 A1* | 12/2008 | Dykes et al. | 705/14 |
| 2010/0313183 A1 | 12/2010 | Ellen et al. | |
| 2011/0314091 A1 | 12/2011 | Podjarny | |

OTHER PUBLICATIONS

Matthew et al.; Beginning Linux Programming; 2008; Wrex Publishing; 4th Edition; pp. 607-644.*
Running Socket Programming (Client/Server) on Single Computer; Sep. 15, 2008; LinuxQuestions.org; pp. 1-3.*
"Introduction to Client/Server Fundamentals;" Client/Server Fundamentals; Feb. 8, 1999; Network Computing; pp. 1-9.*

* cited by examiner

*Primary Examiner* — Andrew Dyer
(74) *Attorney, Agent, or Firm* — Foley and Lardner LLP; John D. Lanza (57) ABSTRACT

A method of fixing a problem with a user interface includes receiving information about the page in an optimization server. The page includes a display element. The information is received from a client with a request for code. Source data of the user interface is received by the client from a server distinct from the optimization server. The method further includes determining that an element on the user interface is associated with a known problem and associated fix. The fix includes modification of the element. An expected conversion rate of the user interface with the modified element is higher than prior to the modification. The method also includes generating code for modifying the element in accordance with the fix and providing the code to the client. The client displays the user interface with the modified element based on the source. Modifying the element does not include modifying the source.

20 Claims, 7 Drawing Sheets

FIXING PROBLEMS WITH A USER INTERFACE

BACKGROUND

The present disclosure relates generally to optimizing a user interface. The present disclosure more specifically relates to providing elements for a web page that are optimized to improve the conversion rate of the web page.

Interactive elements of a user interface, such as in a web page, electronic kiosk, mobile or tablet application, etc., such as buttons and forms, may be activated by a user taking some action, such as clicking on the button with a mouse cursor or entering text into the form. Interacting with such elements may result in a conversion, meaning that the user reaches a goal of, e.g., the web page, such as completing a purchase or signing up for a mailing list. The user also may interact with elements that take the user away from the goals of the web page, such as by navigating to another web page by clicking on an advertisement or other link.

SUMMARY

Implementations of the systems and methods for improving a display element are described herein. One implementation is a method of fixing a problem with a user interface. The method includes receiving information about a user interface in an optimization server. The user interface includes at least one display element. The information about the user interface is received from a client in association with a request for code relating to the user interface, and a source data file of the user interface is received by the client from a server distinct from the optimization server. The method also includes determining, in the optimization server, that at least one of the display elements on the user interface is associated with a known problem and an associated fix of the problem using a database of known problems and fixes. The fix includes a modification of the display element, and an expected conversion rate of the user interface with the modified display element is higher than an expected conversion rate of the user interface prior to the modification. A conversion rate represents a percentage of visitors to the user interface that interact with the user interface to achieve a predetermined goal of the user interface. The method also includes generating code for modifying the display element in accordance with the fix in the optimization server. The method also includes providing the code to the client to display the user interface including the display element modified in accordance with the fix at the client. The user interface is displayed at the client at least in part based on the source data file of the user interface that was provided by the server. Modifying the display element does not include modifying the source data file.

This and other implementations can each optionally include one or more of the following features. The modification of the display element may include at least one of removing the display element, moving the display element to a different location on the user interface, changing a size of the display element, changing a color of the display element, and adding an additional display element to the user interface. The expected conversion rates may be based on empirically observed conversion rates associated with the display elements. The method may also include empirically observing a conversion rate of the user interface including the modified display element.

Another implementation is a computer-readable medium that stores machine instructions. The instructions may be executed by one or more processors to cause the one or more processors to perform operations. The operations include receiving information about a user interface in an optimization server. The user interface includes at least one display element. The information about the user interface is received from a client in association with a request for code relating to the user interface, and a source data file of the user interface is received by the client from a server distinct from the optimization server. The method also includes determining, in the optimization server, that at least one of the display elements on the user interface is associated with a known problem and an associated fix of the problem using a database of known problems and fixes. The fix includes a modification of the display element, and an expected conversion rate of the user interface with the modified display element is higher than an expected conversion rate of the user interface prior to the modification. A conversion rate represents a percentage of visitors to the user interface that interact with the user interface to achieve a predetermined goal of the user interface. The method also includes generating code for modifying the display element in accordance with the fix in the optimization server. The method also includes providing the code to the client to display the user interface including the display element modified in accordance with the fix at the client. The user interface is displayed at the client at least in part based on the source data file of the user interface that was provided by the server. Modifying the display element does not include modifying the source data file.

Another implementation is an optimization server for fixing a problem with a user interface. The server includes a communication interface configured to receive information about the user interface. The user interface includes at least one display element. The information about the user interface is received from a client in association with a request for code relating to the user interface. A source data file of the user interface is received by the client from a server distinct from the optimization server. The server also includes a memory in communication with the communication interface to store the user interface. The server also includes a processor in communication with the memory and the communication interface. The processor is configured to determine that at least one of the display elements on the user interface is associated with a known problem and an associated fix of the problem using a database of known problems and fixes. The fix includes a modification of the display element. An expected conversion rate of the user interface with the modified display element is higher than an expected conversion rate of the user interface prior to the modification. A conversion rate represents a percentage of visitors to the user interface that interact with the user interface to achieve a predetermined goal of the user interface. The processor also is configured to generate code for modifying the display element in accordance with the fix. The processor also is configured to provide the code to the client to display the user interface at the client, including the display element modified in accordance with the fix. The user interface is displayed at the client at least in part based on the source data file of the user interface that was provided by the server. Modifying the display element does not include modifying the source data file.

These implementations are mentioned not to limit or define the scope of this disclosure, but to provide examples of implementations to aid in understanding thereof.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

Figure 1:
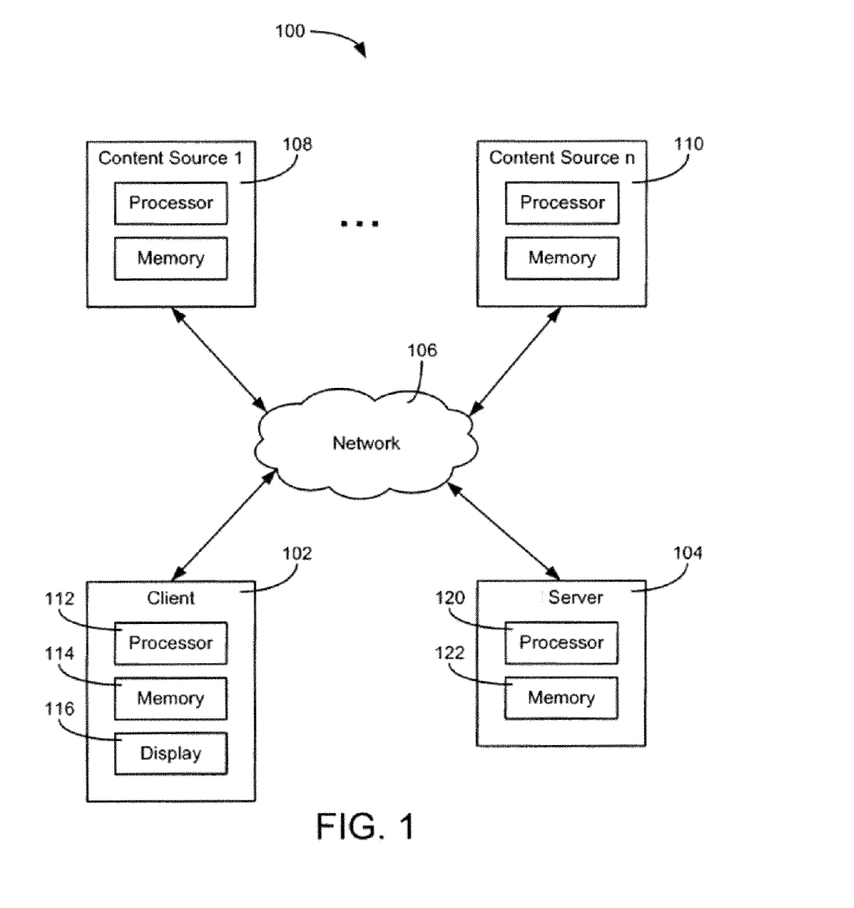
FIG. 1 is a block diagram of a computer system in accordance with a described implementation.

Referring to FIG. 1, a block diagram of a computer system 100 in accordance with a described implementation is shown. System 100 includes a client 102 which communicates with other computing devices via a network 106. For example, client 102 may communicate with one or more content sources ranging from a first content source 108 up to an nth content source 110. Content sources 108, 110 may provide webpages and/or media content (e.g., audio, video, and other forms of digital content) to client 102. System 100 may also include an optimization server 104, which may perform analytics on the webpages provided by content sources 1-n and also may provide content to be included in the webpages over network 106. In the context of this application, "optimization" may include any activities that are performed in support of improving a webpage generally and is not meant as being limited to mathematically optimized operations.

Network 106 may be any form of computer network that relays information between client 102, advertisement server 104, and content sources 108, 110. For example, network 106 may include the Internet and/or other types of data networks, such as a local area network (LAN), a wide area network (WAN), a cellular network, satellite network, or other types of data networks. Network 106 may also include any number of computing devices (e.g., computer, servers, routers, network switches, etc.) that are configured to receive and/or transmit data within network 106. Network 106 may further include any number of hardwired and/or wireless connections. For example, client 102 may communicate wirelessly (e.g., via WiFi, cellular, radio, etc.) with a transceiver that is hardwired (e.g., via a fiber optic cable, a CAT5 cable, etc.) to other computing devices in network 106.

Client 102 may be any number of different user electronic devices configured to communicate via network 106 (e.g., a laptop computer, a desktop computer, a tablet computer, a smartphone, a digital video recorder, a set-top box for a television, a video game console, etc.). Client 102 is shown to include a processor 112 and a memory 114, i.e., a processing circuit. Memory 114 stores machine instructions that, when executed by processor 112, cause processor 112 to perform one or more of the operations described herein. Processor 112 may include a microprocessor, application-specific integrated circuit (ASIC), field-programmable gate array (FPGA), etc., or combinations thereof. Memory 114 may include, but is not limited to, electronic, optical, magnetic, or any other storage or transmission device capable of providing processor 112 with program instructions. Memory 114 may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which processor 112 can read instructions. The instructions may include code from any suitable computer-programming language such as, but not limited to, C, C++, C#, Java, JavaScript, Perl, Python and Visual Basic.

Client 102 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of client 102 (e.g., a built-in display, microphone, etc.) or external to the housing of client 102 (e.g., a monitor connected to client 102, a speaker connected to client 102, etc.), according to various implementations. For example, client 102 may include an electronic display 116, which visually displays webpages using webpage data received from content sources 108, 110 and/or from advertisement server 104.

Content sources 108, 110 are electronic devices connected to network 106 and provide media content to client 102. For example, content sources 108, 110 may be computer servers (e.g., FTP servers, file sharing servers, web servers, etc.) or other devices that include a processing circuit. Media content may include, but is not limited to, webpage data, a movie, a sound file, pictures, and other forms of data. Similarly, optimization server 104 may include a processing circuit including a processor 120 and a memory 122. In some implementations, optimization server 104 may include several computing devices (e.g., a data center, a network of servers, etc.). In such a case, the various devices of optimization server 104 may be in electronic communication, thereby also forming a processing circuit (e.g., processor 120 includes the collective processors of the devices and memory 122 includes the collective memories of the devices).

Optimization server 104 may provide content to client 102 via network 106. For example, content source 108 may provide a webpage to client 102, in response to receiving a request for a webpage from client 102. In some implementations, content from optimization server 104 may be provided to client 102 indirectly. For example, content source 108 may receive content from optimization server 104 and use the content as part of the webpage data provided to client 102. In other implementations, content from optimization server 104 may be provided to client 102 directly. For example, content source 108 may provide webpage data to client 102 that includes a command to retrieve content from optimization server 104. On receipt of the webpage data, client 102 may retrieve content from optimization server 104 based on the command and display the content when the webpage is rendered on display 116.

Figure 2:
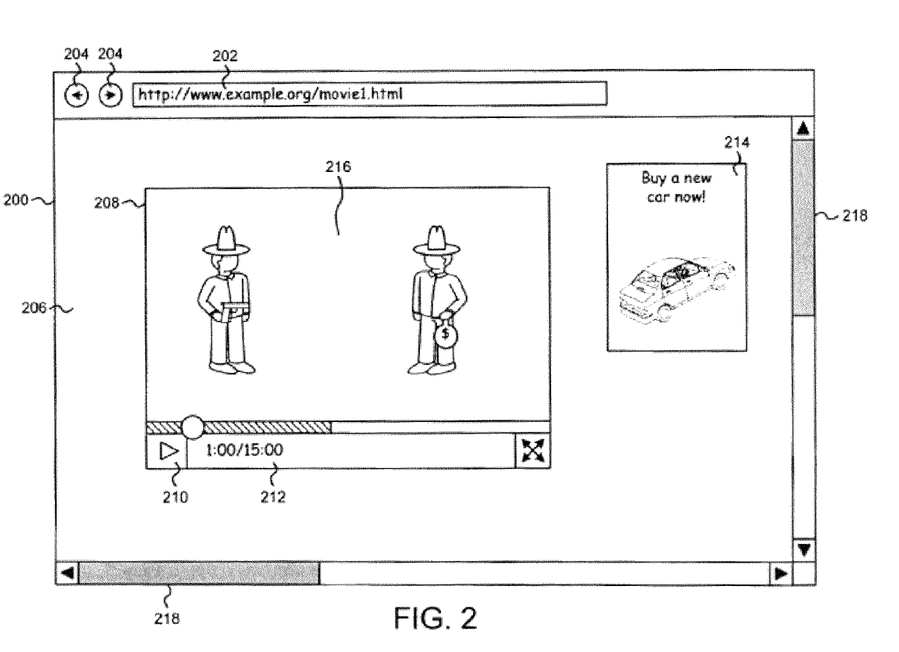
FIG. 2 is a diagram of a web page in accordance with a described implementation.

As shown in FIG. 2, the one or more processors in communication with display 200 may execute a web browser application (e.g., display 200 is part of a client device). The web browser application operates by receiving input of a uniform resource locator (URL) into a field 202, such as a web address, from an input device (e.g., a pointing device, a keyboard, a touchscreen, or another form of input device). In response, one or more processors executing the web browser may request data from a content source corresponding to the URL via a network (e.g., the Internet, an intranet, or the like). The content source may then provide webpage data and/or other data to the client device, which causes visual indicia to be displayed by display 200.

In general, webpage data may include text, hyperlinks, layout information, and other data that is used to provide the framework for the visual layout of displayed webpage 206. In some implementations, webpage data may be one or more files of webpage code written in a markup language, such as the hypertext markup language (HTML), extensible HTML (XHTML), extensible markup language (XML), or any other markup language. For example, the webpage data in FIG. 2 may include a file, "moviel.html" provided by the website, "www.example.org." The webpage data may include data that specifies where indicia appear on webpage 206, such as movie 216 or other visual objects. In some implementations, the webpage data may also include additional URL information used by the client device to retrieve additional indicia displayed on webpage 206. For example, the file, "moviel.html," may also include one or more tags used to retrieve an interactive display element 214 from a remote location (e.g., the optimization server, the content source that provides webpage 206, etc.) and to display the interactive display element 214 on display 200.

A website may include a number of different webpages. In some cases, a website will have one or more "goals," which may be defined as a visitor to the website performing an action that the website seeks to encourage, or otherwise defines as a goal. Generally speaking, this means that the visitor to the website does something that serves the interests of the organization that owns the website. For example, an e-commerce website may have one or more goal webpages that are reached when a sale is completed. Such webpages often simply display a message thanking the customer for the business and indicating that the transaction was completed successfully. In the case of a website belonging to a social organization, on the other hand, a goal may include providing user information, such as email and mailing addresses and phone numbers, and signing up to receive communications from the organization. In such a case also, a goal webpage may provide a confirmation to the visitor that the information was received, and customary message of thanks.

When a visitor to a website navigates to a goal webpage or completes some other predefined interaction or task, this may be referred to as a "conversion." However, not every visitor to a website will result in a conversion. For example, not every visitor to an e-commerce website will buy something or otherwise meet a criterion predefined to represent a conversion. There are various reasons for this. Some visitors may come to the website to browse, and decide that the prices are too high. Other visitors may not find the products they are seeking. Still other visitors may simply be browsing or may have reached the website by mistake.

Some visits, however, will fail to result in a conversion at least in part because of a flaw in the design of the website. When a flaw in the design of a webpage at the website results in a failed conversion, the organization that owns the website suffers a lost opportunity—lost customers, lost money, fewer members of a mailing list, etc.

A "conversion rate" may in some implementations represent a percentage of visitors to a user interface, e.g., a web page, that interact with the user interface to achieve a predetermined goal of the user interface. The design of a user interface generally includes a number of display elements, such as a background, images, text, buttons, links, forms, embedded content, and so on. Changes in the organization and presentation of these elements can have measurable effects on conversion rates, such as may be empirically determined. For example, one way in which a conversion commonly is reached in a web page is through a "call-to-action"—e.g., a message to the visitor to "click here now!" or "press this button to checkout." Often a call-to-action is implemented as a button, although other implementations are possible, such as links, forms, or any other display element that is interactive, such that a visitor to the web page can interact with the element by clicking on it, hovering over it, entering text into a field, etc.

Various inefficiencies in display elements may reduce conversion rates. Such inefficiencies may take the form of known "problems" that may occur with web pages, with adverse consequences for conversion rates. Information for identifying known problems may be stored in a database stored in an optimization server. Such an optimization server may be implemented, e.g., at optimization server 104 in FIG. 1. As an example of a known problem, a web form prompting a user to enter personal information, e.g. for registration purposes, may be inefficiently designed. In the case of a web page for booking travel arrangements, a user may be prompted to enter the number of travelers. The same form also may ask the number of children who are traveling, because children's tickets for travel or spots in hotel rooms may be cheaper, children may travel/stay free under a certain age, children may require special accommodations, etc. It may be a known problem for such a form to ask not only the number of persons and the number of children, but then also to ask for the number of adults. In the present example, the number of adults may be fully determined as the difference between the total number of persons and the number of children, and prompting the user to enter this information would thus be wholly unnecessary. Such inefficiencies in elements of a web page may lead to reduced conversion rates as users get frustrated, distracted, confused, bored, etc. due to the inefficient web page elements.

In the case of a superfluous text entry field for the number of adults, a known fix also may exist for the known problem, and such fixes may be stored in the same database on server 104 that included information about the potential problem. As one example, the field may simply be removed from the web page. In other cases, the field may be presented as optional (in which case data entered into the field may be used to double-check that the user has not miscounted the adults and children by comparing to the total number of persons).

In other cases, elements may be implemented in inefficient sizes. In FIG. 2, for example, interactive display element 214 may be a call-to-action seeking a conversion by convincing a visitor to the webpage to click on the element 214, and thus being presented information about how to "Buy a new car now!" In this simplified example, two different elements are presented on the webpage, namely interactive display element 214 and a movie element 216. The movie element 216 is significantly larger than the interactive display element 214, and thus the movie will likely grab the attention of a visitor to the web page better than the smaller interactive display element 214. This web page may implicate one or more known problems in the database on server 104. For example, one known problem may be having a movie element on a web page that is larger than an interactive display element representing a conversion or progress toward a conversion. Another known problem may be an improper location or color of such an interactive element. Another known problem may be providing such an interactive element in the absence of branding information. Exemplary implementations of fixes of such problems are shown below with reference to FIGS. 3-5.

In some implementations, the database including known problems and fixes may be created by manual entry based on the subjective judgment of one or more database developers. The database also may be populated by problems and fixes that have been observed and empirically detected and verified. The empirical processes also may be performed in whole or in part by persons such as web designers, or also may be performed in whole or in part by automated one or more webpage analysis programs. Known problems and fixes may be gathered from disparate data sources and also may correspond to known issues widely recognized in the industry, or may correspond to proprietary solutions.

Figure 3:
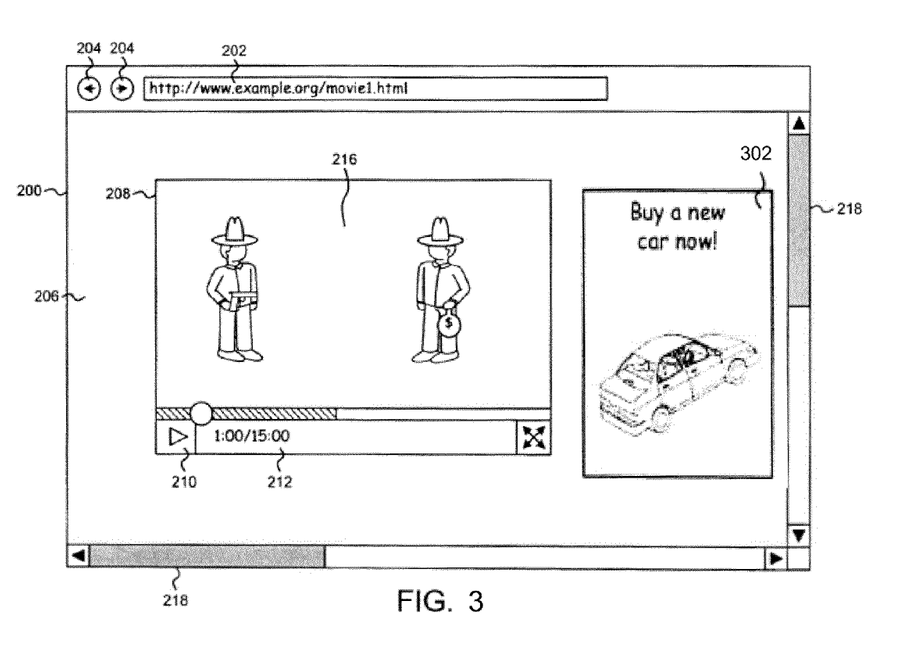
FIG. 3 is a diagram of the web page of FIG. 2, in which a display element has been changed to change a size of the display element.

FIG. 3 is a diagram of the web page of FIG. 2, in which the interactive display element 214 has been replaced with a larger interactive display element 302. The size and prominence of the interactive display element 302 relative to the movie element 216 is now increased, and the likelihood that visitors to the web page will be distracted by the movie, and perhaps fail to notice or forget about buying a car, is similarly reduced.

Figure 4:
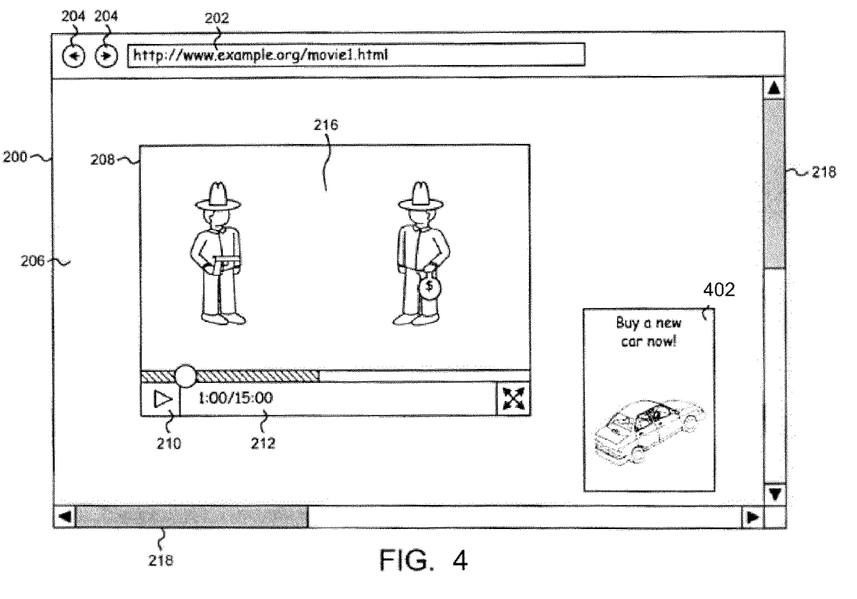
FIG. 4 is a diagram of the web page of FIG. 2, in which a display element has been changed to change a location and color of the display element.

In some cases, certain layouts of display elements have been found to be more likely to result in a conversion than others. Accordingly, simply rearranging the display elements, possibly by moving even a single element (such as a button implementing a call-to-action), the expected conversion rate may be improved. FIG. 4 is a diagram of the web page of FIG. 2, in which the interactive display element 214 has been replaced with an interactive display element 402 in a new location. A color of the interactive display element 402 also may be a different color. Certain colors may have different effects on the moods and actions of people viewing them. Furthermore, the color of a display element may make the display element difficult to see if the color is too similar to a background color of the web page. Such factors may be considered in optimizing a color of an interactive display element.

Figure 5:
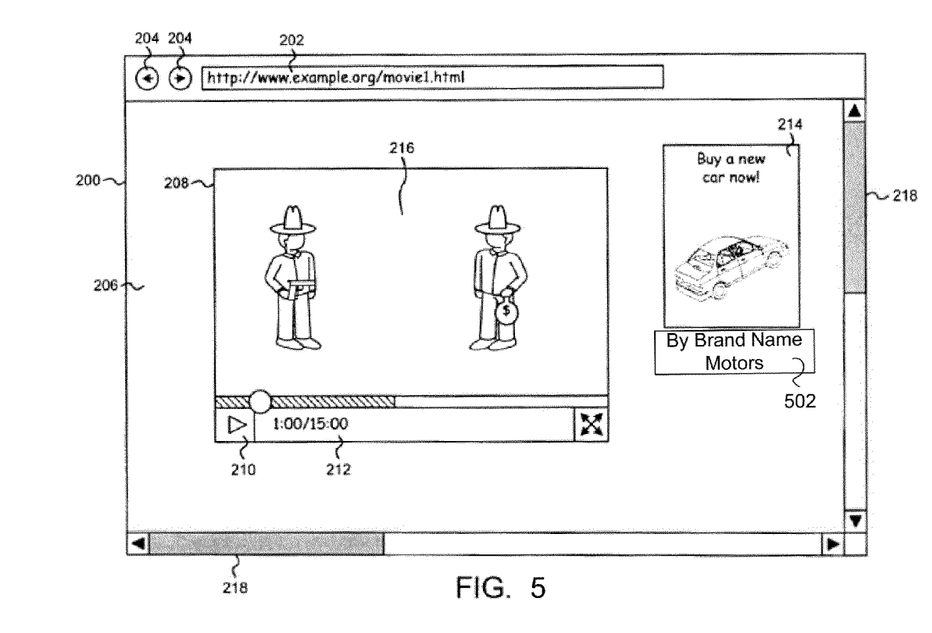
FIG. 5 is a diagram of the web page of FIG. 2, in which a display element has been changed to include a brand name relating to the display element.

In some cases, a web page including interactive display elements may be made more attention-grabbing (and thus more likely to produce a conversion) by including certain familiar images, logos, trademarks, brand names, and the like. A potential customer may be less influenced by a generic message, such as, "Buy a new car now!" and more influenced if the customer also sees something reminding the customer of a well-known brand. FIG. 5 is a diagram of the web page of FIG. 2, in which the interactive display element 214 has been changed to include a brand name 502. Upon seeing the brand name 502, the potential customer may be reminded, for example, of the numerous advertisements s/he has seen and/or heard previously, from any number of sources such as TV, radio, print advertisements, and other internet advertisements.

Figure 6:
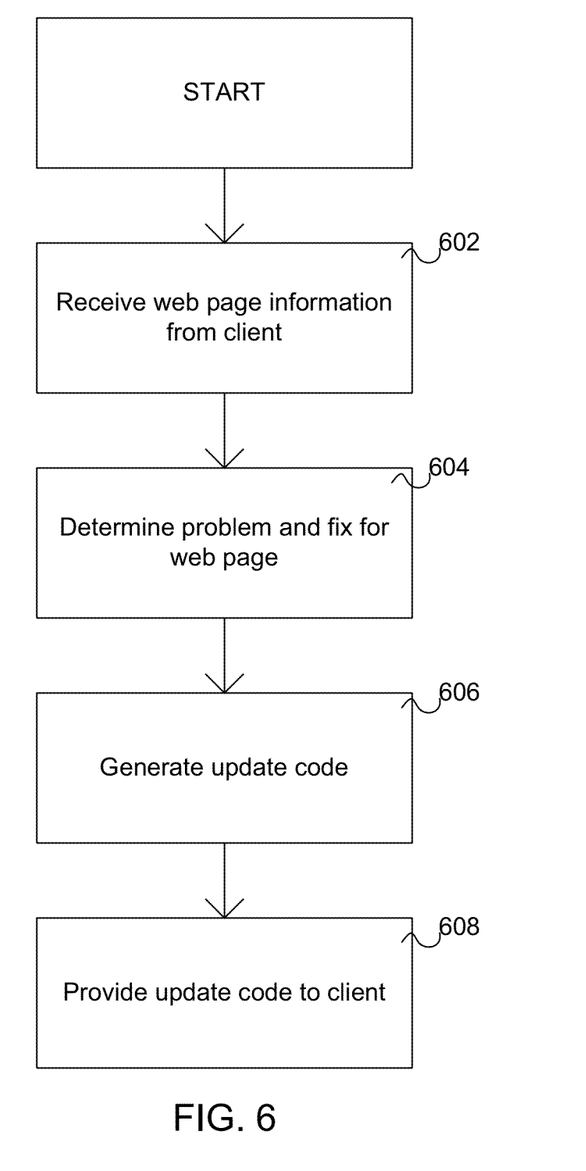
FIG. 6 is a flow diagram of a process in accordance with a described implementation.

A process in accordance with a described implementation is now described with reference to FIG. 6. The process begins at block 602, where the optimization server receives web page information from a client, web server, or other source. The web page information may in some cases be the complete source code of the web page itself that the client previously downloaded from a remote web server, such as one of content servers 108, 110 in FIG. 1. In other cases, the web page information may simply be the Uniform Resource Locator (URL) of the web page or another similar unique identifier of the web page. In other implementations, the web page information may include certain kinds of display elements, such as forms or links, which may be associated with an elevated risk of having known problems compared to other data of the web page. The web page information also may include information about the client itself, such as information about the browser that is being used, the geographic location of the client (e.g., country, city), language being used by the client, etc.

Various techniques are possible for causing the client or other computer to provide web page information to the optimization server, as well. A web page operator may include code in the web page that, when the code is executed by a client that is attempting to view the web page, directs the client to contact an optimization server to determine whether one or more known problems are present on the web page that can be fixed. In other implementations, the client itself may decide to consult an optimization server. For example, a web browser may be configured to include consulting an optimization server as part of a protocol for downloading and viewing web pages.

Sending information to an optimization server may be performed prior to rendering the web page for viewing at the client. Doing so may allow the client to avoid executing a source code file that may include security flaws, for example. Similarly, such an approach may avoid disruptive changes to the rendered web page that is presented to the client. Sending information to an optimization server also may be performed concurrently with, or after rendering the web page for viewing. Such an approach may provide a first rendering of the web page to the client more quickly, but may require that the rendered version changes if a problem fix is received at a later time.

The process continues at block 604, where the optimization server determines that a problem is present in the web page based on the information that was received at block 602. If a problem is found in the database of problems and fixes, an appropriate fix may be determined. The process continues at block 606, where code is generated based on one or more problems and fixes identified at block 604. The code can be used to improve, change, edit, fix, or otherwise modify web page code. The process continues at block 608, where the code is provided to the client. The code can then be used by the client to render the web page with the problem fixed, without the need for any source code files on the web server to be modified at all, as the code is provided by the optimization server to the client. For example, when rendering a web page, a first web server may provide a web page data file and the optimization server may provide one or more fixes to the web page data in the web page data file to make improvements, fixes, etc. The web page data file as stored at the server need not store the fixes provided by the optimization server.

Figure 7:
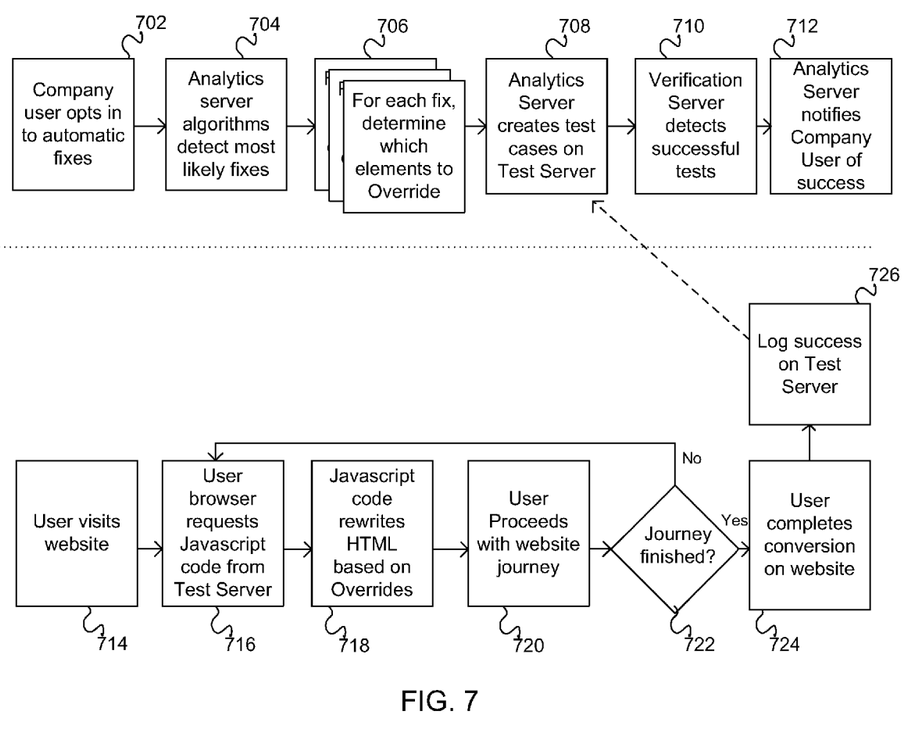
FIG. 7 is a flow diagram of processes in accordance with a described implementation.

FIG. 7 is a flow diagram of processes in accordance with a described implementation. A process by which a company or other entity having a web page may utilize the described implementation begins at block 702, where the company opts in to automatic fixes for the web page. In some cases, this may be accomplished by including code in the source code of the web page that is served to clients, directing the client to contact one or more optimization servers to request fixes. In other implementations, the company may subscribe to an automatic fix provider that is known to receive requests for fixes from clients at the clients' request. In other cases the company is not required to opt in at all, and the client may independently request fixes.

The process continues at block 704, where the optimization server detects problems and determines possible fixes. The detection and fixing may be initiated upon request from a client that is attempting to access a web page. Alternatively, the optimization server may be provided with information about the web page and analyze the web page ahead of time in anticipation of future requests for fixes.

The process continues at block 706, where the fix determines specific changes to web page elements to be made. For example, a fix to a problem may include changing the size of a display element, but information about the client's web browser and screen resolution may in some cases make the fix impractical due to limitations of the client. The client also may only want a limited number of fixes, such as one or two, so as to reduce the amount of further processing required and disruption to rendering of the web page.

The process continues at block 708, where the optimization server optionally creates test cases on a test server. The optimization server may do so to gather data that may be used in suggesting permanent updates to the source code of the web page at the web server, for example. These test cases may be used to document successful conversions reached by the client on the web page which was rendered incorporating one or more fixes.

The process continues at block 710, where a verification server detects successful tests. The verification server verifies the results reported in block 708 and then, at block 712, the optimization server can optionally notify the company or other entity having the web page of the success. The notification may be provided by an appropriate form of electronic communication, such as an email, web account alert, etc. The company may then use this information in determining whether to change the source code of the web page at its own web server according to the fix(es) that was/were provided by the optimization server leading to the successful conversion.

A process by which a user (client) can view a web page according to a described implementation begins at block 714, where the user connects to the web page. The process continues at block 716, where the client requests an optimized web page from the optimization server. This may involve receiving Javascript or other appropriate code from the optimization server or another server such as a test server. The process continues at block 718, where the client receives one or more fixes, e.g., as Javascript code. The Javascript code may implement the one or more fixes by rewriting the HTML code the client has representing the web page, thus modifying one or more elements of the web page as it is displayed in the client's web browser.

The process continues at block 720, where the user continues to navigate the internet. If the user navigates to another web page within the same web site, the process may return to block 716 and the newly accessed web page also may be fixed as appropriate. In some cases, not shown in FIG. 7, the user does not reach a conversion on the website. In the illustrated process, the process continues to block 724, where the user does in fact complete a conversion on the website. In this case, the process may then optionally continue to block 726, where the success is logged, e.g. on a test server, to indicate that the fixed version of the web page resulted in a conversion.

According to one embodiment, a javascript module or other code in a web page that is used for web site analytics (e.g., measurement, collection, analysis and reporting of internet data for purposes of understanding and optimizing web usage) may also be used for the purposes described herein, such as calling .html or other code from an optimization server to fix problems on the web page on the fly, during runtime, or in real time. In some embodiments, fixes to the web site or web page do not occur until a user navigates to a URL to access the web page.

According to one embodiment, a web page includes client side code that is received in the client from a web server. The client side code may be javascript code. When the client executes the code, the client sends a request to an optimization server. The request may include a request for fixes to the webpage. The request also may include information about the webpage that the optimization server may use in determining whether any fixes are available and in determining what fix or fixes to provide. For example, the information may include the client side code of the webpage itself. In other cases, the information may include a subset of the client side code, such as code corresponding to one or more of a particular class of display elements, such as forms, videos, graphics, and the like. The client side code also may cause the client to report analytics information to the optimization server or an analytics server. The analytics information may be used in the optimization server in determining and selecting fixes. The optimization server may then send information about one or more selected fixes to the client. The information may include updated client side code to replace, in whole or in part, the client side code that had been received at the client from the web server. Alternatively, or in addition, the information may include additional client side code to be executed at the client. The information also may include modified display elements for display by the client.

Implementations of the subject matter and the operations described in this specification have been described in the context of display elements on web pages, but other implementations are contemplated as well. For example, display elements for use in user interfaces of automated kiosks where users may purchase train tickets, movie tickets, exchange currency, etc. also may be analyzed and selected according to the principles disclosed herein. Similarly, these principles may be applied to user interfaces of Automated Teller Machines (ATMs) and other computer terminal based applications.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied in a tangible medium, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus or processing circuit on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors or processing circuits executing one or more computer programs to perform actions by operating on input data and generating output. The processes and logic flows can also be performed by, and apparatus can also be implemented as, special purpose logic circuitry, e.g., an FPGA or an ASIC.

Processors or processing circuits suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of fixing a problem with a user interface, the method comprising:
   receiving, at an optimization server via a computer network, a request from a client device distinct from the optimization server for a fix to a problem relating to a user interface, wherein the request is received at the optimization server in response to the client device loading a source data file of the user interface sourced to the client device, via the computer network, from a content server distinct from both the client device and the optimization server, wherein the source data file comprises code that causes the client device to request the fix from the optimization server when the source data file is loaded by the client device;
   accessing, by the optimization server, the content server to obtain a copy of the source data file of the user interface at the optimization server, the user interface including at least one display element;
   determining, by the optimization server using the source data file of the user interface and a database of known problems and fixes, that at least one of the display elements on the user interface is associated with a known problem and an associated fix of the problem, wherein the fix includes a modification of the display element, wherein an expected conversion rate of the user interface with the modified display element is higher than an expected conversion rate of the user interface prior to the modification, wherein a conversion rate represents a percentage of visitors to the user interface that interact with the user interface to achieve a predetermined goal of the user interface;
   generating, by the optimization server, code for modifying the display element in accordance with the fix; and
   providing the code for modifying the display element from the optimization server to the client device via the computer network, wherein the client device uses the code for modifying the display element to modify the display element and to display, at the client device, the user interface including the display element modified in accordance with the fix, wherein the user interface is displayed at the client device at least in part based on the source data file of the user interface that was provided to the client device by the content server, and wherein modifying the display element does not include modifying the source data file at the content server or at the optimization server.

2. A method in accordance with claim 1, wherein the modification of the display element includes removing the display element.

3. A method in accordance with claim 1, wherein the modification of the display element includes moving the display element to a different location on the user interface.

4. A method in accordance with claim 1, wherein the modification of the display element includes changing a size of the display element.

5. A method in accordance with claim 1, wherein the modification of the display element includes changing a color of the display element.

6. A method in accordance with claim 1, wherein the modification of the display element includes adding an additional display element to the user interface.

7. A method in accordance with claim 1, wherein the expected conversion rates are based on empirically observed conversion rates associated with the display elements.

8. A method in accordance with claim 1, further comprising empirically observing a conversion rate of the user interface including the modified display element.

9. A non-transitory computer-readable medium having machine instructions stored therein, the instructions being executable by one or more processors to cause the one or more processors to perform operations comprising:
   receiving, at an optimization server via a computer network, a request from a client device distinct from the optimization server for a fix to a problem relating to a user interface, wherein the request is received at the optimization server in response to the client device loading a source data file of the user interface sourced to the client device, via the computer network, from a content server distinct from both the client device and the optimization server, wherein the source data file comprises code that causes the client device to request the fix from the optimization server when the source data file is loaded by the client device;
   accessing, by the optimization server, the content server to obtain a copy of the source data file of the user interface at the optimization server, the user interface including at least one display element;
   determining, by the optimization server using the source data file of the user interface and a database of known problems and fixes, that at least one of the display elements on the user interface is associated with a known problem and an associated fix of the problem, wherein the fix includes a modification of the display element, wherein an expected conversion rate of the user interface with the modified display element is higher than an expected conversion rate of the user interface prior to the modification, wherein a conversion rate represents a percentage of visitors to the user interface that interact with the user interface to achieve a predetermined goal of the user interface;
   generating, by the optimization server, code for modifying the display element in accordance with the fix; and
   providing the code for modifying the display element from the optimization server to the client device via the computer network, wherein the client devices uses the code for modifying the display element to modify the display element and to display, at the client device, the user interface including the display element modified in accordance with the fix, wherein the user interface is displayed at the client device at least in part based on the source data file of the user interface that was provided to the client device by the content server, and wherein modifying the display element does not include modifying the source data file at the content server or at the optimization server.

10. A computer-readable medium in accordance with claim 9, wherein the modification of the display element includes removing the display element.

11. A computer-readable medium in accordance with claim 9, wherein the modification of the display element includes moving the display element to a different location on the user interface.

12. A computer-readable medium in accordance with claim 9, wherein the modification of the display element includes changing a size of the display element.

13. A computer-readable medium in accordance with claim 9, wherein the modification of the display element includes changing a color of the display element.

14. A computer-readable medium in accordance with claim 9, wherein the modification of the display element includes adding an additional display element to the user interface.

15. A computer-readable medium in accordance with claim 9, wherein the expected conversion rates are based on empirically observed conversion rates associated with the display elements.

16. A computer-readable medium in accordance with claim 9, wherein the operations further comprise empirically observing a conversion rate of the user interface including the modified display element.

17. An optimization server for fixing a problem with a user interface, comprising:
   a communication interface configured to receive via a computer network, a request from a client device distinct from the optimization server for a fix to a problem relating to a user interface, wherein the request is received at the optimization server in response to the client device loading a source data file of the user interface sourced to the client device, via the computer network, from a content server distinct from both the client device and the optimization server, wherein the source data file comprises code that causes the client device to request the fix from the optimization server when the source data file is loaded by the client device;
   a memory, in communication with the communication interface, to store the user interface; and
   a processor, in communication with the memory and the communication interface and configured to:
   access the content server to obtain a copy of the source data file of the user interface at the optimization server;
   determine, using the source data file of the user interface and a database of known problems and fixes, that at least one of the display elements on the user interface is associated with a known problem and an associated fix of the problem, wherein the fix includes a modification of the display element, wherein an expected conversion rate of the user interface with the modified display element is higher than an expected conversion rate of the user interface prior to the modification, wherein a conversion rate represents a percentage of visitors to the user interface that interact with the user interface to achieve a predetermined goal of the user interface;
   generate code for modifying the display element in accordance with the fix; and
   provide the code for modifying the display element from the optimization server to the client device via the computer network, wherein the client device uses the code for modifying the display element to modify the display element and to display, at the client device, the user interface including the display element modified in accordance with the fix, wherein the user interface is displayed at the client device at least in part based on the source data file of the user interface that was provided by the content server, and wherein modifying the display element does not include modifying the source data file at the content server or at the optimization server.

18. A server in accordance with claim 17, wherein the modification of the display element includes removing the display element.

19. A method in accordance with claim 1, wherein the modification of the display element includes moving the display element to a different location on the user interface.

20. A method in accordance with claim 1, wherein the modification of the display element includes changing a size of the display element.

* * * * *